Patented Apr. 11, 1950

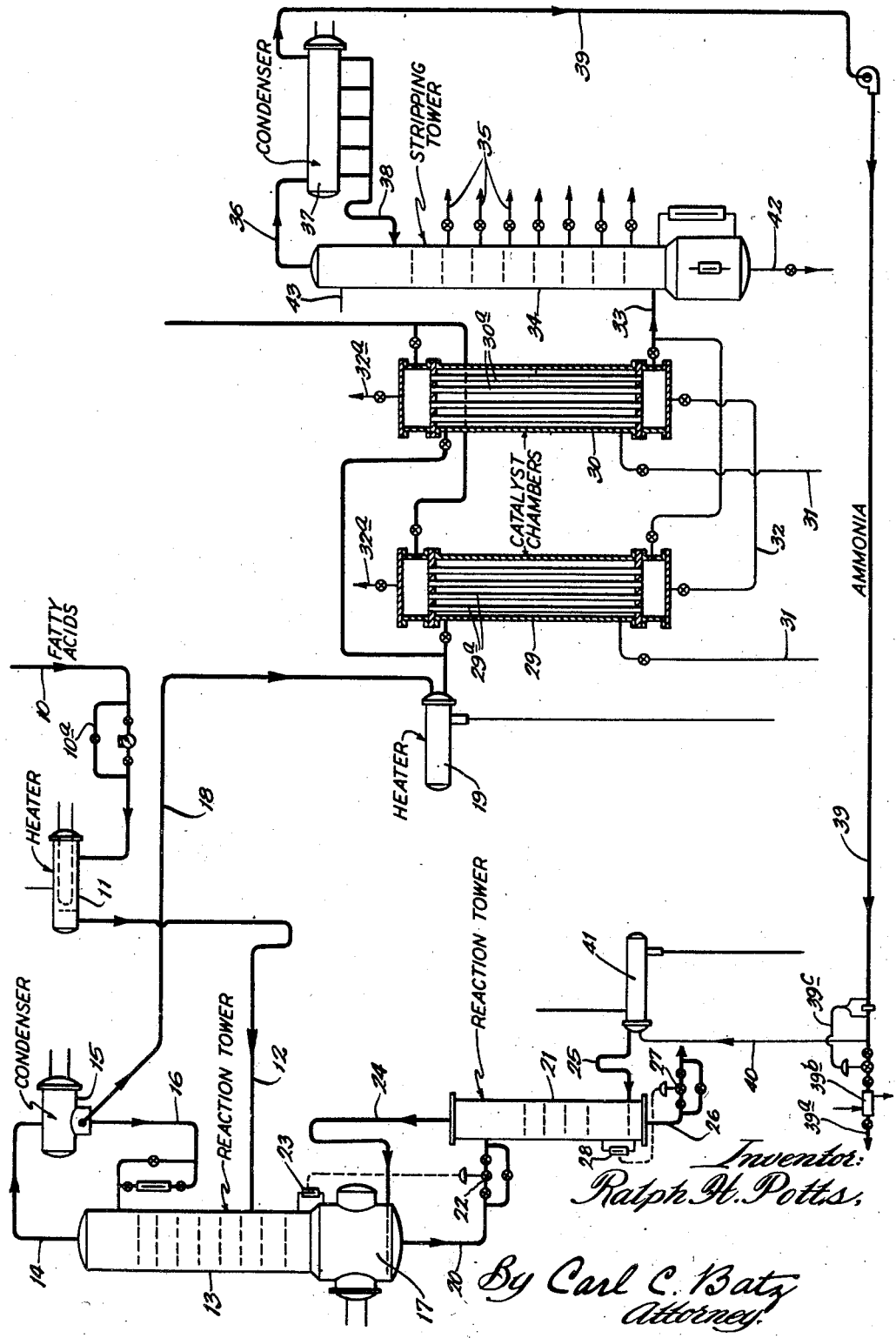

2,504,045

UNITED STATES PATENT OFFICE 2,504,045

METHOD OF SEPARATING ALIPHATIC NITRILES, WATER, AMMONIA, AND HYDROGENATION-INHIBITING IMPURITIES

Ralph H. Potts, La Grange, Ill., assignor to Armour and Company, Chicago, Ill., a corporation of Illinois Application August 8, 1945, Serial No. 609,678

8 Claims. (Cl. 202—40)

This invention relates to a method for separating ammonia and water from aliphatic nitriles of six or more carbon atoms, and is particularly useful in the separation of ammonia and water from nitriles produced by the action of ammonia on an organic acid, such nitriles having six or more carbon atoms.

This application is a continuation-in-part of my application S. N. 602,220, filed June 29, 1945, now Patent No. 2,448,275, granted August 31, 1948.

In the manufacture of nitriles by the action of ammonia on organic acids and in which the nitriles are subsequently hydrogenated, there are produced hydrogenation-inhibiting factors which obstruct hydrogenation and reduce the efficiency of the process. Further, in attempts to recover and reuse the ammonia, impurities, such as low-boiling decomposition products produced in the process, tend to foul the boilers employed and to disrupt ammonia recovery.

An object of the present invention is to provide a process under which such hydrogenation-inhibiting factors and such decomposition products can for the most part be eliminated at little or no expense, while at the same time permitting the efficient return of the ammonia and also successful hydrogenation of the nitriles. A further object is to provide a method for the ready and accurate separation of water and ammonia from such nitriles while eliminating the impurities in the process largely through the withdrawal of water. Other specific objects and advantages will appear as the details of the process are set out.

For the purpose of illustration, the process is described herein in connection with apparatus with which the process may be successfully carried out, the apparatus being shown in the drawing appended hereto.

In the illustration given, the fatty acid charging stock is introduced through line 10 into the preheater 11 in which any suitable medium, such as, for example, Dowtherm, may be employed for drying the stock. Preferably, flow-control apparatus 10ᵃ, which per se is of well-known construction, is employed to maintain a constant rate of flow through line 10. From the heater, the fatty acids which have been preheated pass through line 12 to a reaction tower 13 in which the fatty acids are brought into contact with ammonia and nitrile vapors. The reaction tower 13 is provided with an overhead outlet line 14 leading to a condenser 15. Nitrile vapors, ammonia, water of reaction, and some fatty acids will distill upwardly through the tower and be partially condensed in reflux condenser 15. The higher boiling constitutents such as the fatty acids, together with a large amount of nitriles, will condense and be returned through line 16 to the tower as reflux liquid. The uncondensed nitriles, fatty acids, ammonia, and water will pass through line 18 to the heater 19. The effect of the reflux liquid is to force the higher boiling fatty acid material downwardly through the tower to the heater 17 at the base of the tower. The heater 17 shown in the drawing is of the Calandria type employing Dowtherm as a heating medium. Other types of heaters using any suitable heating medium may be employed. The heater 17 brings the material to a temperature suitable for liquid phase reaction of the fatty acids and ammonia (about 575°–625° F. for most charging stocks). A residue withdrawal line 20 leads from the base of tower 13 and enters the upper portion of a second reaction tower 21.

The tower 13 is provided with trays or pans as indicated in the drawing by dotted lines 13ᵃ and gaseous ammonia passing upwardly in the tower comes successively into contact with liquid fatty acids on these trays to complete the liquid phase reaction and produce the nitrile product. The ratio of nitriles to fatty acids becomes progressively greater toward the top of the tower.

As illustrated diagrammatically, means are provided for automatically maintaining a level of high boiling fatty acid residue in the lower portion of tower 13. Valve mechanism 22 is controlled by electric mechanism of well-known construction (per se), actuated by a level control 23 at the lower portion of tower 13. By this well-known means, a predetermined level is maintained in the tower.

Reaction tower 21 may be of any suitable construction. In the illustration given, it is shown provided with an overhead vapor line 24 through which ammonia and nitrile vapors pass into the lower portion of the pool maintained in the base of tower 13. Heated ammonia is passed into the base of tower 21 through line 25. A residual line 26 leads from the base of tower 21 and is employed for the withdrawal of pitch, which may be intermittent or continuous. In the structure shown, I provide a valve 27 which is electrically-operated to control the withdrawal of pitch in accordance with a level control device 28 at the lower portion of tower 21.

Tower 21 may be provided with trays 21ᵃ indicated by dotted lines in the drawing. These trays contain a certain amount of liquid fatty acids and the gaseous ammonia passing upwardly in large volume comes successively into contact with the liquid in each tray. The ammonia serves to carry the fatty acids upwardly separating them from the pitch and also reacts with the acids to some extent to produce an appreciable amount of nitriles in this tower.

The vapors not condensed in partial condenser 15 pass through line 18 and are preferably heated to a temperature suitable for reaction of vaporous acids with ammonia in the presence of a dehydrating catalyst (600°–700° F. for most stocks) in heater 19, and are then passed through one of the catalyst chambers 29 and 30. Catalyst chamber 29 has tubes 29ᵃ in which is held a suitable dehydrating catalyst, such as nickel or alumina, and chamber 30 has similar tubes 30ᵃ. The catalyst chambers may be of any suitable construction. They are shown each provided with heating lines 31 through which Dowtherm or other heating fluid may be passed into the chambers about the tubes 29ᵃ and 30ᵃ. Lines 32 may be employed for introducing steam and air into the catalyst chambers for the purpose of regeneration of the catalyst, and valve-controlled vents 32ᵃ permit the escape of steam and air.

From the catalyst chambers, material passes through line 33 into a stripping tower 34 having bubble pans or plates, as indicated by dotted lines therein, with a series of vertically spaced draw-off outlets 35. The overhead vapors pass out through line 36 and are condensed in the condenser 37, the condensate being returned through line 38 to the upper portion of the stripping tower. The uncondensed ammonia is returned through line 39 and may be reused by passing it through line 40 and heater 41 from which it enters the reaction tower 21 through pipe 25.

Additional ammonia to make up the deficiency in line 39 may be introduced through line 39ᵃ. Such ammonia preferably passes through a steam heater 39ᵇ. While valves are provided for hand control of line 39ᵃ, I prefer to employ an automatic flow-control device 39ᶜ of the orifice-plate-air-line valve type, which per se is of well-known construction and serves to maintain a constant rate of flow through line 40.

Through the use of the stripping tower 34, with its bubble trays and the spaced draw-off pipes 35, and by the removal of large quantities of the water of reaction condensed within the tower, I find that the impurities which have heretofore obstructed ammonia recovery through the fouling of the boilers and the impurities constituting hydrogenation-inhibiting factors may be successfully removed at substantially no expense. The mixture of fatty acid nitriles, water, and ammonia passing through line 30 enter the stripping tower 34 near the base thereof at a high temperature which maintains the mixture in vaporous phase, for example, at a temperature in the neighborhood of 680° F. Such vapors entering the base of the column pass upwardly through the bubble trays counter-current to a descending stream of water. Since there are two moles of water for each mole of nitriles produced, there is an abundance of water, as water of reaction, and this furnishes an excellent means for the elimination of the impurities. The vapors entering the base of the column pass upwardly through the bubble trays counter-current to the descending stream of water. Vaporization of the water produces a condensation of the nitriles, which then flow downwardly toward the bottom of the column. The ammonia and water vapors tend to condense in the pools of liquid to some extent; the vapors evolved through the topmost tray pass through the line 36 into the condenser 37 and are to a large extent condensed, the condensate being returned through line 38 while the uncondensed ammonia is returned, as already described, through line 39 to the reaction tower 21. The nitrile producing method described above is claimed in R. H. Potts Patent 2,448,275, which issued August 31, 1948.

As a result of the foregoing operations, water and ammonia will collect on the trays, the extreme upper trays containing a relatively high percentage of ammonia and the intermediate trays containing substantially no ammonia but water mixed with impurities. An intermediate tray is selected which, for the material undergoing treatment, contains substantially pure water carrying the impurities referred to, and a steady stream of water may be withdrawn at this point to eliminate such impurities from the system. If desired, aqueous ammonia may be withdrawn from an upper tray and other fractions withdrawn from lower trays.

Nitriles are recovered separately and may be withdrawn continuously from the lower end of the column through line 42.

If desired, water may be introduced separately through line 43 or through the reflux line 38 as an additional control in the condensation of the nitriles or for removal of excess impurities. Normally, however, the large amount of water produced in the process is ample for satisfactory removal of the mass of the impurities.

The process is continuous, affords a sharp separation, and permits an accurate control by which desired constituents of the mixture may be obtained.

While in the foregoing specification, I have set forth one mode of operation for the method, it will be obvious that detailed steps therein and temperature and other conditions may be varied widely without departing from the spirit of my invention.

I claim:

1. In a process of the character set forth, the steps of passing a mixture of aliphatic nitriles having at least six carbon atoms, water of reaction, ammonia, and hydrogenation inhibiting impurities produced in the formation of nitriles by the action of ammonia on fatty acids into a separating zone, maintaining in said zone heat-exchanging pools of ammonia, water, and nitriles, contacting vapors from said mixture with said pools to vaporize water and ammonia therein and condense said nitriles, withdrawing nitriles from the lower end of said zone substantially free of said impurities, and withdrawing water containing impurities separately and at a point above the point of withdrawal of nitriles.

2. In a process of the character set forth, the steps of passing a mixture of aliphatic nitriles having at least six carbon atoms, water of reaction, ammonia, and hydrogenation inhibiting impurities produced in the formation of nitriles by the action of ammonia on fatty acids into a separating zone, maintaining in said zone heat-exchanging pools of ammonia, water, and nitriles, contacting vapors from said mixture with said pools to vaporize water and ammonia therein and condense said nitriles, withdrawing uncondensed ammonia from the upper portion of said zone, withdrawing nitriles substantially free of said impurities from a lower portion of said zone, and withdrawing water containing impurities at an intermediate point in said zone.

3. In a nitrile process of the character set forth, the steps of passing a mixture of aliphatic nitriles having at least six carbon atoms, water, ammonia, and hydrogenation-inhibiting impurities produced in the formation of nitriles by the action of ammonia on fatty acids into a separating zone, maintaining in said zone heat-exchanging pools of ammonia, water, and nitriles, contacting vapors from said mixture with said pools to vaporize water and ammonia therein and condense said nitriles, withdrawing ammonia and nitriles at opposite ends of said separating zone, and withdrawing water from said zone at a point intermediate said withdrawal points for ammonia and nitriles.

4. In a method of the character set forth, the steps of passing a mixture of aliphatic nitriles having at least six carbon atoms, water, ammonia, and hydrogenation-inhibiting impurities produced in the formation of nitriles by the action of ammonia on fatty acids into a separating zone, maintaining in said zone heat-exchanging pools of ammonia, water, and nitriles, contacting vapors from said mixture with said pools to vaporize water and ammonia therein and condense said nitriles, withdrawing ammonia from an upper portion of said zone and nitriles from a lower portion thereof, and withdrawing water containing the greater part of said impurities from an intermediate point in said zone.

5. In a process of the character set forth, the steps of passing a mixture of aliphatic nitriles having at least six carbon atoms, water, ammonia, and hydrogenation inhibiting impurities produced in the formation of nitriles by the action of ammonia on fatty acids into a separating zone, maintaining in said zone heat-exchanging pools of ammonia, water, and nitriles, contacting vapors from said mixture with said pools to vaporize water and ammonia therein and condense nitriles, withdrawing ammonia and nitriles from said zone at separate points, and withdrawing water containing the bulk of said impurities separately at another point in said zone.

6. In a method for separating hydrogenation-inhibiting materials produced in the formation of nitriles by the action of ammonia on fatty acids from a mixture containing aliphatic nitriles having at least six carbon atoms, water, and ammonia, comprising passing said mixture in vapor phase into a separating zone, maintaining in said zone heat-exchanging pools of ammonia and water, contacting vapors from said mixture with said pools to vaporize water and ammonia therein and condense said nitriles whereby said water-containing hydrogenation-inhibiting material is segregated mainly in one of said pools, withdrawing water from said last-mentioned pool, and withdrawing nitriles from another pool substantially free of said hydrogenation-inhibiting materials.

7. A method of the character set forth, comprising passing a mixture of aliphatic nitriles having at least six carbon atoms, water, ammonia, and hydrogenation-inhibiting impurities produced in the formation of nitriles by the action of ammonia on fatty acids into a separating zone, maintaining in said zone heat-exchanging pools of ammonia and water, contacting vapors from said mixture with said pools to vaporize water and ammonia therein and condense said nitriles, withdrawing ammonia and water vapors from the last of said pools and condensing at least a portion of the same, returning the condensate to at least one of said pools, separately withdrawing nitriles substantially free of said impurities, and separately withdrawing water containing the bulk of said impurities.

8. A method of the character set forth, comprising passing aliphatic nitriles having at least six carbon atoms, ammonia, water, and hydrogenation-inhibiting impurities produced in the formation of nitriles by the action of ammonia on fatty acids in vapor phase into a separating zone, maintaining in said zone a series of heat-exchanging pools consisting preponderately of water, contacting vapors from said mixture with said pool to vaporize water therein and condense said nitriles, maintaining in said zone a second series of heat-exchanging pools containing substantial amounts of aqueous ammonia, contacting evolved vapors from said first series of pools with the liquid in said second series of pools, withdrawing uncondensed ammonia from said second series of pools, separately withdrawing nitriles from said zone, and withdrawing water from said first series of heat-exchanging pools containing the bulk of said impurities.

RALPH H. POTTS.

REFERENCES CITED

The following references are of record in the file of this patent:

UNITED STATES PATENTS

| Number | Name | Date |
|---|---|---|
| 2,061,314 | Ralston et al. | Nov. 17, 1936 |
| 2,178,506 | Weir | Oct. 31, 1939 |
| 2,238,016 | Downey | Apr. 8, 1941 |
| 2,314,894 | Potts et al. | Mar. 30, 1943 |
| 2,395,057 | Marsh et al. | Feb. 19, 1946 |
| 2,448,275 | Potts | Aug. 31, 1948 |